(12) United States Patent
Ishiyama et al.

(10) Patent No.: US 11,577,487 B2
(45) Date of Patent: Feb. 14, 2023

(54) SYNTHETIC RESIN SKIN MATERIAL COMPOSITE AND METHOD OF PRODUCING SYNTHETIC RESIN SKIN MATERIAL COMPOSITE

(71) Applicants: KYOWA LEATHER CLOTH CO., LTD., Hamamatsu (JP); HAYASHI TELEMPU CORPORATION, Nagoya (JP); INOAC CORPORATION, Nagoya (JP)

(72) Inventors: Tomoyuki Ishiyama, Hamamatsu (JP); Kenji Kubo, Hamamatsu (JP); Tetsuya Ogawa, Nagoya (JP); Atsuhiko Itakura, Anjo (JP)

(73) Assignees: KYOWA LEATHER CLOTH CO., LTD., Hamamatsu (JP); HAYASHI TELEMPU CORPORATION, Nagoya (JP); INOAC CORPORATION, Nagoya (JP)

( * ) Notice: Subject to any disclaimer, the term of this patent is extended or adjusted under 35 U.S.C. 154(b) by 29 days.

(21) Appl. No.: 16/644,930

(22) PCT Filed: Sep. 26, 2018

(86) PCT No.: PCT/JP2018/035738
§ 371 (c)(1),
(2) Date: Mar. 5, 2020

(87) PCT Pub. No.: WO2019/065758
PCT Pub. Date: Apr. 4, 2019

(65) Prior Publication Data
US 2021/0162705 A1   Jun. 3, 2021

(30) Foreign Application Priority Data
Sep. 29, 2017   (JP) .............................. JP2017-192165

(51) Int. Cl.
*B32B 5/24* (2006.01)
*B32B 27/40* (2006.01)
(Continued)

(52) U.S. Cl.
CPC .............. *B32B 5/245* (2013.01); *A47C 31/02* (2013.01); *B29C 59/026* (2013.01); *B32B 3/266* (2013.01);
(Continued)

(58) Field of Classification Search
CPC ......... B32B 5/245; B32B 3/266; B32B 5/026; B32B 5/18; B32B 27/12; B32B 27/40; B32B 2266/0278; Y10T 428/24512
See application file for complete search history.

(56) References Cited

U.S. PATENT DOCUMENTS 3,740,283 A * 6/1973 Maxey ........................ C08J 9/36
156/162
2006/0000186 A1 * 1/2006 Carlson ............... B29C 44/1228
52/793.1

(Continued)

FOREIGN PATENT DOCUMENTS

JP   S62-110992 A   5/1987
JP   64-13316   †   1/1989

(Continued)

OTHER PUBLICATIONS

[NPL-1] Yoshimura, et al. (WO 2017-006556 A1); Jan. 12, 2017, (EPO machine translation to English). (Year: 2017).*

(Continued)

*Primary Examiner* — David Sample
*Assistant Examiner* — Donald M Flores, Jr.
(74) *Attorney, Agent, or Firm* — Oliff PLC

(57) ABSTRACT

A synthetic resin skin material composite, including: a urethane resin skin material including a urethane resin skin
(Continued)

layer provided at one surface of a substrate; and a cushion layer that is placed at a surface on an opposite side of the substrate from the surface of the urethane resin skin material at which the urethane resin skin layer is provided; in which the urethane resin skin material has recesses at a side of the urethane resin skin layer, and each of the recesses has a depth in a thickness direction of the synthetic resin skin material composite, such that the recesses extend from the urethane resin skin layer into the cushion layer beyond an interface between the urethane resin skin material and the cushion layer that is present in a region without a recess, as well as a method of producing a synthetic resin skin material composite.

20 Claims, 3 Drawing Sheets

(51) Int. Cl.
*B32B 7/12* (2006.01)
*B32B 5/02* (2006.01)
*B32B 5/18* (2006.01)
*B32B 27/12* (2006.01)
*B32B 3/30* (2006.01)
*B32B 3/26* (2006.01)
*B29C 59/02* (2006.01)
*A47C 31/02* (2006.01)
*D06N 3/00* (2006.01)
*B29K 75/00* (2006.01)
*B29K 105/04* (2006.01)

(52) U.S. Cl.
CPC ............... *B32B 5/026* (2013.01); *B32B 5/18* (2013.01); *B32B 27/12* (2013.01); *B32B 27/40* (2013.01); *D06N 3/00* (2013.01); *B29K 2075/00* (2013.01); *B29K 2105/04* (2013.01); *B32B 2266/0278* (2013.01); *Y10T 428/24512* (2015.01)

(56) References Cited

U.S. PATENT DOCUMENTS

| | | | | |
|---|---|---|---|---|
| 2011/0111657 A1* | 5/2011 | Xia | ........................ | D06N 3/145 428/423.4 |
| 2016/0129665 A1* | 5/2016 | Cho | ........................ | B32B 7/06 442/370 |
| 2017/0266913 A1† | 9/2017 | Kaneko | | |
| 2017/0305126 A1† | 10/2017 | Takeshita | | |
| 2019/0039346 A1* | 2/2019 | Yoshimura | ................ | B32B 3/30 |

FOREIGN PATENT DOCUMENTS

| | | | |
|---|---|---|---|
| JP | S64-13316 U | | 1/1989 |
| JP | H045313 Y2 | * | 2/1992 |
| JP | H07-132573 A | | 5/1995 |
| JP | 2002-155474 A | | 5/2002 |
| JP | 2002-155476 A | | 5/2002 |
| JP | 2003-326598 | † | 11/2003 |
| JP | 2003-326598 A | | 11/2003 |
| JP | 2005-261581 | † | 9/2005 |
| JP | 2005-261581 A | | 9/2005 |
| JP | 2007-276285 | † | 10/2007 |
| JP | 2007-276285 A | | 10/2007 |
| JP | 2007-331222 | † | 12/2007 |
| JP | 2007-331222 A | | 12/2007 |
| JP | 2013-72147 A | | 4/2013 |
| JP | 2016-129994 A | | 7/2016 |
| JP | 2016-147432 | † | 8/2016 |
| JP | 2016-147432 A | | 8/2016 |
| JP | 2017-165209 A | | 9/2017 |
| WO | 2015/022772 | † | 2/2015 |
| WO | 2015/022772 A1 | | 2/2015 |
| WO | WO2015/022772 | | 2/2015 |
| WO | WO-2015022772 A1 * | | 2/2015 ............. B32B 3/266 |
| WO | 2017/006556 A1 | | 1/2017 |
| WO | WO-2017006556 A1 * | | 1/2017 ............. B32B 27/40 |
| WO | WO-2017056465 A1 * | | 4/2017 ............. B32B 5/026 |

OTHER PUBLICATIONS

[NPL-2] Juichi et al. (JP H04-005313 Y2); Feb. 1992 (JPP machine translation to English). (Year: 1992).*
[NPL-3] Yoshimura et al. (WO 2015/022772 A1); Feb. 2015 (EPO machine translation). (Year: 2015).*
[NPL-4] Yoshimura (WO 2017/056465 A1); Apr. 6, 2017 (EPO machine translation). (Year: 2017).*
Oct. 23, 2019 Office Action issued in Japanese Patent Application No. 2019-527931.
Dec. 25, 2018 International Search Report issued in International Patent Application No. PCT/JP2018/035738.

\* cited by examiner
† cited by third party

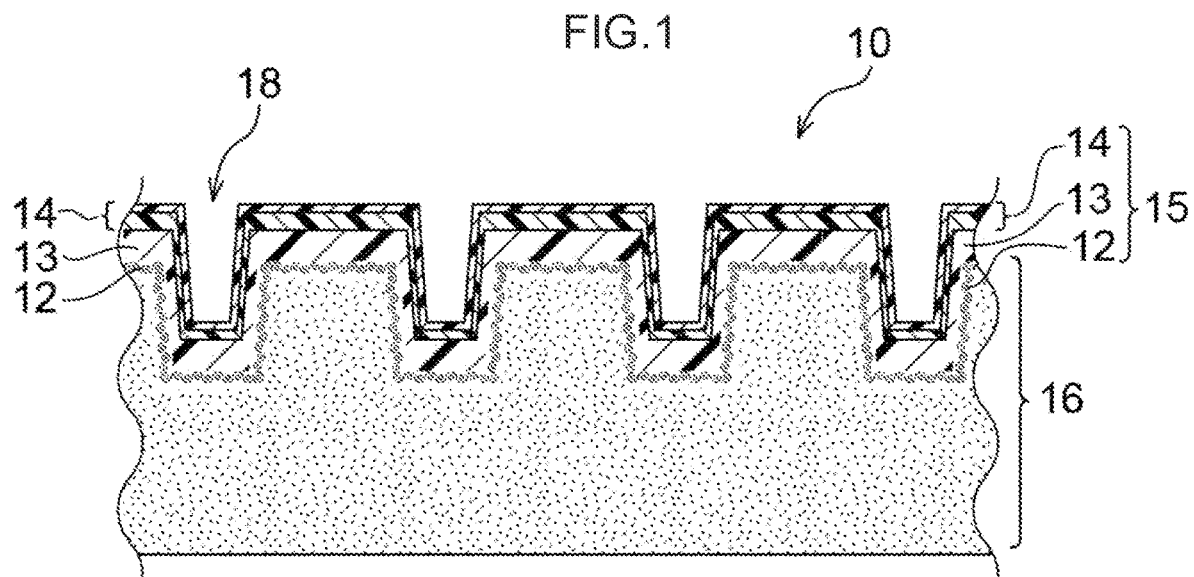
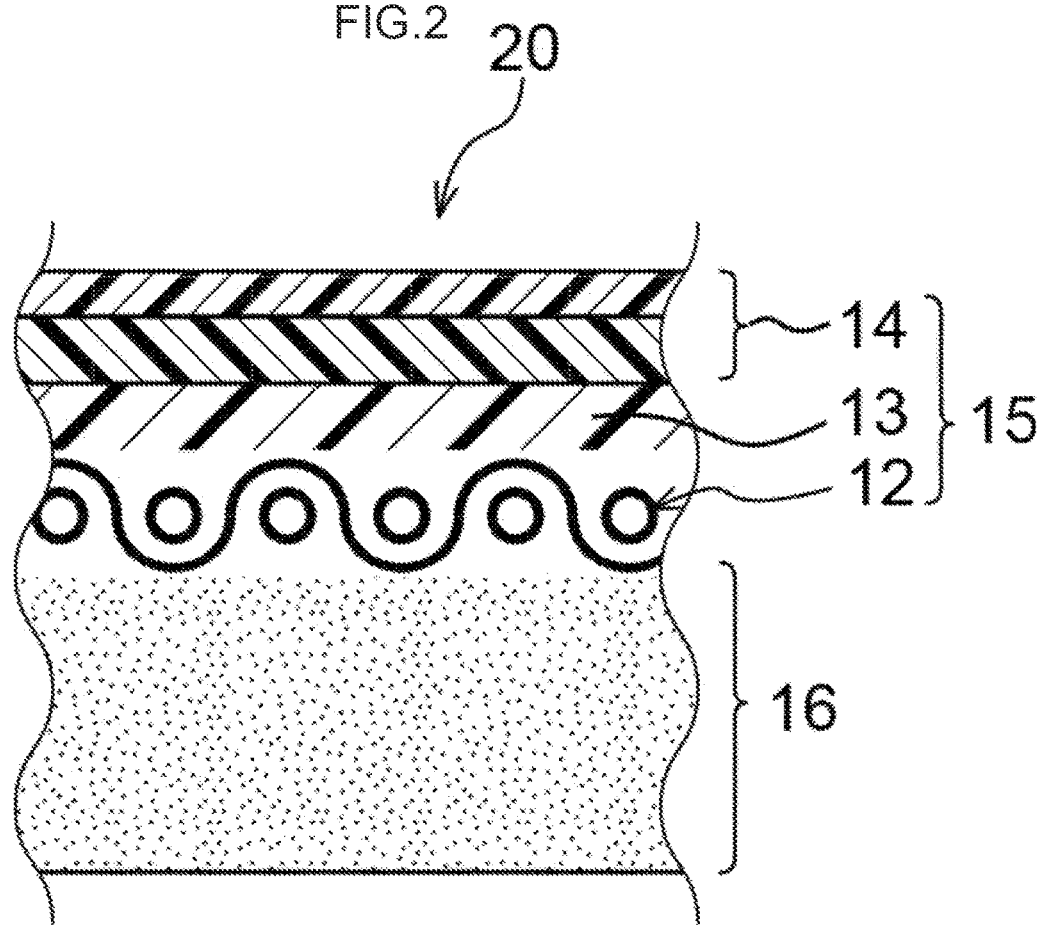

SYNTHETIC RESIN SKIN MATERIAL COMPOSITE AND METHOD OF PRODUCING SYNTHETIC RESIN SKIN MATERIAL COMPOSITE

TECHNICAL FIELD

The present disclosure relates to a synthetic resin skin material composite, and a method of producing a synthetic resin skin material composite.

BACKGROUND ART

Synthetic leathers excellent in durability have been heavily used for automotive interior parts, such as instrument panels, door trims, seats, and headliners, railway vehicle interior parts or aircraft interior parts, such as trims, seats, and ceilings, furniture, shoes, footwear, bags, interior/exterior materials for buildings, outer covering materials or backing materials for clothes, covering materials for walls, and the like, in place of natural leathers or fibrous sheets. Such synthetic leathers have stepped portions, namely grain pattern similar to natural leathers on outermost surfaces.

In recent years, skin materials with three-dimensional shape having deeper recessed portions have been demanded as synthetic leathers that are used for automotive seats, chairs, or the like, than synthetic leathers with leather-like shallow recessed portions that have been conventionally widely used.

For this reason, those that have been prepared by using clothes (fabric) as substrates, on the back surfaces of which urethane foam layers are provided for imparting cushioning property thereto, and on the top surfaces of which skin layers are provided for imparting high designability thereto, are used commonly.

For example, an interior material that has a wet microporous layer, a polyurethane adhesive layer, and a urethane skin layer at a side of napped surface of a base cloth with raised fibers, in which tips of the raised fibers of the base cloth are present within the polyurethane adhesive layer, has been proposed as an automotive interior material using wet-processing for imparting a soft feel to a skin layer (see Japanese Patent Application Laid-Open (JP-A) No. H07-132573).

Further, a method of integrally laminating a flexible polyurethane foam material having specific properties with an outer fabric with a constant load elongation of from 2% to 50%, to form a laminate sheet, placing the laminate sheet and a forming die that is provided with a large number of protrusions between a top and bottom pair of heating platens, and performing hot press, has been proposed as a method of producing a skin material having stepped portions, in which a stepped pattern can be deeply and clearly formed, and the shape of stepped portions is hardly deformed despite long-term use (see JP-A No. 2003-326598).

SUMMARY OF INVENTION

Technical Problem

Although the interior material described in JP-A No. H07-132573 is an interior material that provides a voluminous feeling because it is based on wet processing, it is difficult to form recesses which are deep enough to develop stepped portions with a three-dimensional feeling. Therefore, further improvement in terms of designability is desired.

The skin material obtained by the production method described in JP-A No. 2003-326598 is excellent in shape retaining property of stepped portions because it is embossed at a side of the base cloth. However, since the shape of stepped potions solely depends on properties of the base cloth, designability with a deep three-dimensional stepped feeling has not yet been attained.

An object of an embodiment of the present invention is to provide a synthetic resin skin material composite that has a three-dimensional shape with deeper recesses and is favorable in shape retention capability of the formed three-dimensional shape, in comparison with the grain pattern of the surface of a conventionally widely used synthetic resin skin material.

An object of another embodiment of the present invention is to provide a method of producing a synthetic resin skin material composite, the method being capable of producing a synthetic resin skin material composite that has a three-dimensional shape with deep recesses and is favorable in shape retention capability of the formed three-dimensional shape.

Solution to Problem

Means for solving the objects above includes the following embodiments.

<1> A synthetic resin skin material composite, including: a urethane resin skin material including a urethane resin skin layer provided at one surface of a substrate; and a cushion layer that is placed at a surface on an opposite side of the substrate from the surface of the urethane resin skin material at which the urethane resin skin layer is provided; in which the urethane resin skin material has recesses at a side of the urethane resin skin layer, and each of the recesses has a depth in a thickness direction of the synthetic resin skin material composite, such that the recesses extend from the urethane resin skin layer into the cushion layer beyond an interface between the urethane resin skin material and the cushion layer that is present in a region without a recess.

<2> The synthetic resin skin material composite according to <1>, in which a thickness of the cushion layer is from 1 mm to 15 mm, and the thickness of the cushion layer is larger than a thickness of the urethane resin skin material.

<3> The synthetic resin skin material composite according to <1> or <2>, in which the urethane resin skin material is a dry resin skin material or a wet resin skin material.

<4> The synthetic resin skin material composite according to any one of <1> to <3>, in which the urethane resin skin material has a number of holes that penetrate the urethane resin skin material in the thickness direction of the synthetic resin skin material composite.

<5> A method of producing a synthetic resin skin material composite, the method including: forming a urethane resin skin layer at one surface of a substrate, to yield a urethane resin skin material; forming a cushion layer at a side of the urethane resin skin material at which the urethane resin skin layer is not provided, to yield a laminate of the urethane resin skin material and the cushion layer; and placing the yielded laminate between a pair of molds including a first mold with an embossing die and a second mold without an embossing die, heating the first mold at a temperature in a range of from 130° C. to 160° C. and heating the second mold at a temperature in a range of from 140° C. to 200° C., and pressing protrusions of the embossing die of the first mold onto a side of the urethane resin skin layer of the laminate for embossing under a condition that tips of the protrusions of the embossing die of the first mold extend into the cushion layer, thereby forming recesses having depths such that the recesses extend into the cushion layer beyond an interface between the urethane resin skin material and the cushion layer.

<6> The method of producing a synthetic resin skin material composite according to <5>, in which the forming a cushion layer at a side of the urethane resin skin material at which the urethane resin skin layer is not provided, to yield a laminate of the urethane resin skin material and the cushion layer, includes adhering a flexible polyurethane foam material as the cushion layer.

<7> The method of producing a synthetic resin skin material composite according to <6>, in which the adhering a flexible polyurethane foam material as the cushion layer includes flame lamination.

<8> The method of producing a synthetic resin skin material composite according to any one of <5> to <7>, in which the urethane resin skin material is a dry resin skin material or a wet resin skin material.

<9> The method of producing a synthetic resin skin material composite according to any one of <5> to <8>, further including forming a number of holes that penetrate the urethane resin skin material in a thickness direction of the synthetic resin skin material composite.

Advantageous Effects of Invention

According to an embodiment of the present invention, a synthetic resin skin material composite that has a three-dimensional shape with deeper recesses and is favorable in shape retention capability of the formed three-dimensional shape, in comparison with the grain pattern of the surface of a conventionally widely used synthetic resin skin material can be provided.

According to another embodiment of the present invention, a method of producing a synthetic resin skin material composite, the method being capable of producing a synthetic resin skin material composite that has a three-dimensional shape with deep recesses and is favorable in shape retention capability of the formed three-dimensional shape can be provided.

BRIEF DESCRIPTION OF DRAWINGS

FIG. 1 is a schematic sectional view showing a synthetic resin skin material composite, which is an embodiment of the present invention.

FIG. 2 is a schematic sectional view showing a laminate of a synthetic resin skin material and a cushion layer used for producing a synthetic resin skin material composite as shown in FIG. 1.

DESCRIPTION OF EMBODIMENTS

Figure 3:
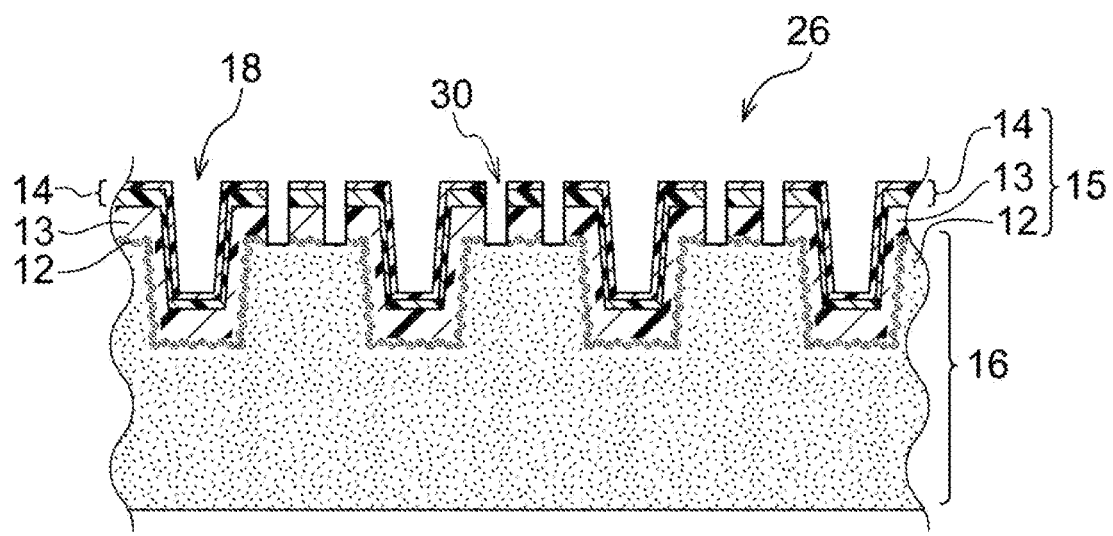
FIG. 3 is a schematic sectional view showing a synthetic resin skin material composite having a number of holes that penetrate the urethane resin skin material in a thickness direction of a synthetic resin skin material composite, which is another embodiment of the present invention.

A numerical range expressed by "x to y" includes the values of x and y in the range as the minimum and maximum values, respectively.

The term "step" includes herein not only an independent step, but also a step which may not necessarily be clearly separated from another step, insofar as an intended purpose of the step can be attained.

Further, in referring herein to a content of each component in a composition, when plural substances exist corresponding to a component in the composition, the content means, unless otherwise specified, a total amount of the plural substances existing in the composition.

In a numerical range described herein in stages, an upper limit value or a lower limit value of one numerical range may be replaced with an upper limit value or a lower limit value of another numerical range described in stages. Further, in a numerical range given herein, an upper limit value or a lower limit value of a numerical range may be replaced with a value shown in Examples.

In the present disclosure, a combination of preferable embodiments is a more preferable embodiment.

In the present disclosure, a cloth (fabric) used as a substrate of a synthetic resin skin material such as a urethane resin skin material may be referred to as a base cloth.

In the present disclosure, a urethane resin and a polyurethane are synonymous. In this regard, the terms "urethane resin" and "polyurethane" in the present disclosure refer to a resin having a urethane bond, and are used to encompass various modified products of a "urethane resin" and "polyurethane".

A synthetic resin skin material composite and a method of producing the same of the present disclosure will be more specifically described below.

[Synthetic Resin Skin Material Composite]

A synthetic resin skin material composite of the present disclosure includes: a urethane resin skin material including a urethane resin skin layer provided at one surface of a substrate; and a cushion layer that is placed at a surface on an opposite side of the substrate from the surface of the urethane resin skin material at which the urethane resin skin layer is provided; in which the urethane resin skin material has recesses at a side of the urethane resin skin layer, and each of the recesses has a depth in a thickness direction of the synthetic resin skin material composite, such that the recesses extend from the urethane resin skin layer into the cushion layer beyond an interface between the urethane resin skin material and the cushion layer that is present in a region without a recess.

Although the action in the present disclosure is not clear, it is conceivable as follows.

Since a synthetic resin skin material composite of the present disclosure has a structure of a laminate of a widely used urethane resin skin material, and a cushion layer, the synthetic resin skin material composite has a thickness, flexibility, and a cushioning property suitable for three-dimensional shape. Further, since it has, from a side of the urethane resin skin material of the laminate toward the cushion layer, deep recesses, more specifically, recesses having a depth in a thickness direction of the synthetic resin skin material composite, such that the recesses extend from the urethane resin skin layer into the cushion layer beyond an interface between the urethane resin skin material and the cushion layer that is present in a region without a recess, a synthetic resin skin material composite having a three-dimensional shape with recesses deeper than conventional ones can be provided.

Further, the method of producing a synthetic resin skin material composite of the present disclosure includes a step of adhering a urethane resin skin material having a urethane resin skin layer at one surface of a widely used substrate, with a flexible polyurethane foam material. By this step, a laminate that has a cushion layer of a flexible polyurethane foam material on the urethane resin skin material can be formed, thereby yielding a laminate that has a sufficient thickness and is excellent in cushioning property.

Thereafter, the yielded laminate is placed between a pair of molds including a first mold with an embossing die and a second mold without an embossing die, each of the molds is heated in an appropriate temperature range, and embossing is performed by pressing tips of protrusions of the embossing die onto a side of the urethane resin skin layer of the laminate such that tips of the protrusions of the embossing die extend into the cushion layer.

In this case, the outermost urethane resin skin layer and the cushion layer become more easily deformable by heating, so that recesses having a sufficient depth that extends from a side of the urethane resin skin layer of the laminate into the cushion layer can be easily formed.

By changing a shape of the embossing die that is attached to the mold, a synthetic resin skin material composite provided with recesses having an optional shape and depth can be produced.

An example of a synthetic resin skin material composite of the present disclosure will be described below with reference to the drawings.

FIG. 1 is a schematic sectional view showing a synthetic resin skin material composite 10, which is an embodiment of the present disclosure. The synthetic resin skin material composite 10 is a laminate including: a urethane resin skin material 15 that includes a urethane resin skin layer 14 and an adhesive layer 13 at one surface of a substrate 12; and a cushion layer 16 at a surface on an opposite side of the surface of the urethane resin skin material 15 at which the urethane resin skin layer 14 is provided.

In this regard, the adhesive layer 13 is an optional layer which may be provided for improving the adhesion between the substrate 12 and the urethane resin skin layer 14, as described later.

FIG. 2 shows an embodiment of a laminate 20 including: a urethane resin skin material 15; and a cushion layer 16 that is provided at a surface on an opposite side of the surface of the urethane resin skin material 15 at which the urethane resin skin layer 14 is provided.

In FIG. 2, the urethane resin skin layer 14 in the urethane resin skin material 15 has two resin layers, but the layer structure of a urethane resin skin material 15 in the present disclosure is not limited to the embodiment shown in FIG. 2.

There is no particular restriction on the structure of a urethane resin skin material, insofar as it has at least one urethane resin skin layer. The urethane resin skin material may have, for example, a structure having only a urethane resin skin layer that includes a urethane resin on a substrate 12, a multilayer structure having a urethane resin skin layer and a layer of another resin, a multilayer structure having a number of urethane resin skin layers with different compositions, or a structure having a surface treatment layer on a surface of a urethane resin skin layer.

By laminating the cushion layer 16 at a side of the substrate 12 of the urethane resin skin material 15, a laminate 20 having a larger thickness and a superior cushioning property in comparison with a conventional urethane resin skin material 15 can be yielded.

Recesses 18 are formed at a side of the urethane resin skin layer 14 in the laminate 20 as an example shown in FIG. 2, to yield the synthetic resin skin material composite 10 as an example shown in FIG. 1. Each of the recesses 18 is formed to have a depth in a thickness direction of the synthetic resin skin material composite, such that the recesses extend from the urethane resin skin layer 14 into the cushion layer 16 beyond an interface between the urethane resin skin material 15 and the cushion layer 16 that is present in a region without a recess.

Thus, the synthetic resin skin material composite 10 of the present disclosure is a synthetic resin skin material composite 10 having a three-dimensional shape with deep recesses 18.

In the synthetic resin skin material composite of the present disclosure, the urethane resin skin material 15 that is located at the outermost surface has the urethane resin skin layer 14 provided at at least one surface of the substrate 12.

[Urethane Resin Skin Material]

A urethane resin skin material that may be used for a synthetic resin skin material composite of the present disclosure will be described below. There is no particular restriction on the urethane resin skin material, insofar it has a urethane resin skin layer provided at one surface of a substrate, and a publicly known urethane resin skin material may be appropriately selected for use.

The urethane resin skin material in the present disclosure may be a dry resin skin material or a wet resin skin material.

A dry resin skin material in the present disclosure means a skin material in which a base cloth that is not subjected to processing is stuck with a urethane resin skin layer, and a wet resin skin material means a skin material in which a base cloth is subjected to wet processing to become a wet base, and the wet base is then stuck with a urethane resin skin layer.

A dry resin skin material is lightweight and superior in flexibility. On the other hand, a wet resin skin material, in which a base cloth is impregnated with a resin and then stuck with a skin layer, has a base cloth with a strength enhanced by the taken-up resin, and is suppressed from fraying of the base cloth in the case of forming through-holes described later.

An example of each constituent layer in the urethane resin skin material will be described below.

[Substrate]

There are no particular restrictions on the substrate used in a urethane resin skin material of the present disclosure, and a publicly known substrate for a synthetic resin skin material may be appropriately selected for use.

The substrate is preferably a base cloth, because it is favorable in flexibility and strength. Examples of the base cloth include a woven fabric, a knitted fabric, and a non-woven fabric.

Among these, the substrate is preferably a knitted fabric from the viewpoints of the shape followability and the durability in forming deep recessed portions. A knitted fabric as the base cloth may be a single knitted fabric, a double knitted fabric, or a pile fabric. Further, a knitted fabric may be subjected to a raising treatment at at least one surface.

There is no particular restriction on the fiber constituting a base cloth, insofar as it has required strength and flexibility.

The fiber to be used for a base cloth may be appropriately selected depending on the intended use of the synthetic resin skin material composite. A single kind, or two or more kinds of fibers may be used for the base cloth.

Examples of a preferable fiber to be used for the base cloth include a polyester fiber, a polyamide fiber, a Kevlar fiber which is a high-strength polyamide fiber, a polyurethane fiber, a cotton fiber, a hemp fiber, a rayon fiber, and a nylon fiber.

For example, when a polyurethane fiber is included as a part of fibers used for knitting a knitted fabric as the base cloth, the stretchability of the base cloth is improved. Further, when a polyester fiber, a Kevlar fiber, or the like is included in the fibers used for knitting the base cloth, the strength of the base cloth is further improved.

Among these, the base cloth preferably includes a polyester fiber from the viewpoint of superior durability and flexibility.

A thickness of the base cloth is appropriately selected depending on the intended use of the synthetic resin skin material composite. Generally, it may be in a range of from 0.5 mm to 1.5 mm.

(Production of Base Cloth for Wet Skin Material)

In a case in which a wet skin material is formed, a base cloth is first impregnated with a resin solution, the solvent in the resin solution is replaced with water, and the cloth is dried, by which a base cloth for forming a wet skin material in which a porous structure is formed can be obtained.

As the resin, a polyurethane is preferable. Examples of a polyurethane include a polycarbonate polyurethane, a polyether polyurethane, and a polyester polyurethane. A polycarbonate polyurethane and a polyether polyurethane are preferable from the viewpoints of resistance to hydrolysis, resistance to thermal degradation, or the like.

The resin solution for impregnating a base cloth may contain various components as needed, in addition to the resin as a base component and the solvent.

In the present disclosure, the "resin as a base component" in the resin solution for impregnating a base cloth means a resin that is contained in an amount of more than 20% by mass in terms of solid concentration with respect to a total amount of the composition containing the resin.

For example, when the resin solution contains a flame retardant, the flame retardancy of the synthetic resin skin material composite can be improved.

Examples of the flame retardant include an organic flame retardant, such as a phosphorus flame retardant, a nitrogen-phosphorus flame retardant, or a halogen flame retardant.

Further, the resin solution may contain, for example, a colorant, a leveling agent, or the like.

(Urethane Resin Skin Layer)

A urethane resin skin layer in the present disclosure is placed at one surface of the base cloth described above. Hereinafter, the urethane resin skin layer may be simply referred to as a "skin layer".

Among these, the skin layer in the present disclosure contains a urethane resin (hereinafter also referred to as a polyurethane) from the viewpoints of excellent durability and elasticity, as well as excellent processability in forming deep recesses.

There is no particular restriction on the synthetic resin used for forming the skin layer, insofar as a urethane resin is contained, and in addition to the urethane resin, other synthetic resin may be appropriately selected for use in combination depending on the intended use. Examples of such other synthetic resin used for forming the skin layer include a vinyl chloride resin, an acrylic resin, and a polyester.

Examples of the polyurethane to be used for forming the skin layer include a polycarbonate polyurethane, a polyether polyurethane, a polyester polyurethane, and a modified product thereof.

A polycarbonate polyurethane is preferable from the viewpoint that the synthetic resin skin material composite of the present disclosure is used for applications requiring long-term durability, such as an automotive interior material or a chair.

As the polyurethane, a commercially available product may be used. For example, CRISVON (registered trademark) NY-324, produced by DIC Corporation may be preferably used.

The polyurethane used for forming the skin layer preferably has a hardness as measured according to JIS K 6301 of from 49 N/cm$^2$ to 980 N/cm$^2$, and more preferably from 196 N/cm$^2$ to 588 N/cm$^2$ at 100% modulus.

A softening point of the polyurethane is preferably 130° C. or higher, and more preferably 150° C. or higher.

The softening point of the polyurethane can be measured by the testing method of softening temperature defined in JIS K 7196 (2012).

As a method of adjusting the hardness (100% modulus) of the polyurethane, for example in the case of reducing the hardness, there is a method in which a content ratio of a polyol that forms a soft segment is increased, or a molecular weight of a polyol is increased. In the case of increasing the hardness of a polyurethane, there are, for example, a method in which a content of a urethane bond or a urea bond that forms a hard segment is increased, and a method in which a crosslinking agent, such as hexamethylene diisocyanate (HDI), a hydrogenated xylylene diisocyanate (hydrogenated XDI), isophorone diisocyanate (IPDI), or dicyclohexylmethane diisocyanate (hydrogenated MDI), is added to a polyurethane base component, and energy is applied to form a crosslinked structure.

A polyurethane that is appropriately selected from a water-based polyurethane, a solvent-free polyurethane, or solvent-based polyurethane may be used for the polyurethane in the skin layer.

There is no particular restriction on the urethane resin skin material, insofar as it includes a substrate, and at least one skin layer containing a urethane resin. As described above, the urethane resin skin material may include a number of layers each containing a urethane resin, or include, in addition to the layer containing a urethane resin, a layer containing other resin, such as a vinyl chloride resin, an acrylic resin, or a polyester.

If desired, a surface of the skin layer may be previously provided with an optional stepped pattern (grain) such as a leather-like pattern. The recess of the stepped pattern that is previously provided in the skin layer is preferably a recess with a depth smaller than the thickness of the skin layer.

The urethane resin skin material may be formed by coating a synthetic resin such as a polyurethane on the base cloth described above and drying it, or may be formed by laminating a preformed urethane resin sheet on the base cloth.

In addition to the polyurethane as a base component and other synthetic resin that is optionally used, a publicly known additive used for a synthetic resin skin material may be further added to the skin layer for the purpose of imparting various functions, such as designability, improvement of feel, or improvement of strength, to the extent that the effect is not impaired.

Examples of the additive that may be added in the skin layer include a crosslinking agent, a crosslinking accelerator, a colorant, a feel improver, a film-forming aid, a flame retardant, and a foaming agent.

For example, when the skin layer contains a colorant, the designability of the resulting synthetic resin skin material composite can be improved. Further, by adding a publicly known flame retardant, such as a phosphorus-based, a halogen-based, or an inorganic metal-based flame retardant, improvement of the flame retardancy of the skin material can be attained.

A thickness of the skin layer is appropriately selected depending on the intended use of the synthetic resin skin material composite. Since the synthetic resin skin material composite of the present disclosure has deep recesses, the thickness of the skin layer is preferably in a range of from 10 μm to 100 and more preferably in a range of from 15 μm to 60 from the viewpoint of processability in forming the recesses.

(Adhesive Layer)

The synthetic resin skin material composite of the present disclosure may be provided with an adhesive layer 13 between the base cloth 12 and the urethane resin skin layer 14. By providing an adhesive layer 13 as an optional layer, the adhesiveness between the base cloth 12 and the urethane resin skin layer 14 can be further improved.

There is no particular restriction on an adhesive that may be used to form the adhesive layer. Examples of the adhesive include an adhesive containing a polyurethane, a vinyl chloride resin, or an acrylic resin.

More specifically, for example, (1) a two-component curable polyester adhesive, (2) a two-component curable polyurethane adhesive, or (3) a two-component curable acrylic pressure-sensitive adhesive may be used preferably.

In this regard, as an adhesive used for forming the adhesive layer, commercial products are also available, and preferable examples thereof include a welder adhesive No. 3660 (two-component curable polyurethane adhesive, No-tape Industrial Co., Ltd.), DAIKALAC 7250NT (two-component curable polyester adhesive, Daido Chemical Corporation), CRISVON TA265 (two-component curable polyether adhesive, DIC Corporation), and CRISVON TA205 (polycarbonate polyurethane adhesive, DIC Corporation).

Examples of a method of forming the adhesive layer include a method in which an adhesive for forming an adhesive layer is coated on a back surface of the urethane resin skin layer 14, and a base cloth is then pressed tightly to the surface on which the adhesive has been coated, followed by drying with heat to complete adhesion between the urethane resin skin layer 14 and the base cloth 12.

In this regard, the urethane resin skin material 15, which is a synthetic resin skin material in the present disclosure, refers to a laminate of the urethane resin skin layer 14 and the base cloth 12 as described above and, in the case in which it has also an adhesive layer 13, it refers to a laminate of the urethane resin skin layer 14, the adhesive layer 13, and the base cloth 12, as shown in FIG. 1.

[Cushion Layer]

The synthetic resin skin material composite of the present disclosure is provide with a cushion layer that is placed at a side of the above-described urethane resin skin material at which the urethane resin skin layer is not provided, namely at a side of the base cloth of the above-described urethane resin skin material.

The cushion layer is a layer formed of a synthetic resin with excellent elasticity, and there is no particular restriction on the synthetic resin that is used, insofar as the required elasticity is achievable. Among these, from the viewpoint of light weight and excellent elasticity, a layer formed of a synthetic resin foam is preferable. Air bubbles in the foam may be open cells, closed cells, or in combination thereof.

Examples of the synthetic resin that may be used for forming the cushion layer include a polyurethane, poly(vinyl chloride), and a polyolefin, and from the viewpoint of elasticity, a polyurethane is preferable and a flexible polyurethane is more preferable.

Examples of a method of forming the cushion layer on the urethane resin skin material include a forming method in which a cushion layer forming material is adhered to a urethane resin skin material, and a forming method in which a precursor for a cushion layer forming material is coated on a urethane resin skin material.

As for the cushion layer, for example, a foam raw material (a precursor for a cushion layer forming material) may be previously formed into a synthetic resin foam, which is then adhered to form a cushion layer, or a foam raw material that contains a synthetic resin or a synthetic resin precursor (a precursor for a cushion layer forming material) may be coated directly on a urethane resin skin material and foamed on the skin material to form a synthetic resin foam that encloses air bubbles.

Among these, in forming a cushion layer, a synthetic resin foam is preferably used and an open-cell flexible polyurethane foam material is more preferably used as a cushion layer forming material, from the viewpoint of favorable cushioning property and processability.

The flexible polyurethane foam material is formed by reacting and foaming a foam raw material that contains a polyol, a polyisocyanate, a foaming agent, and a catalyst. The flexible polyurethane foam material in the present disclosure means a material that includes a polyurethane enclosing air bubbles, is lightweight, generally has an open cell structure where cells communicate each other, is flexible, and has resilience to pressure or deformation. A foam raw material useful for forming the flexible polyurethane foam material will be described below in sequence.

A polyester polyol, a polyether polyester polyol, or a polyether polyol may be used as the polyol.

Examples of the polyester polyol include: a condensation polyester polyol obtained by reacting a polycarboxylic acid, such as adipic acid or phthalic acid, with a polyol, such as ethylene glycol, diethylene glycol, propylene glycol, or glycerin; a lactone polyester polyol; and a polycarbonate polyol.

As the polyether polyester polyol, for example, a product is used which is obtained by adding an alkylene oxide, such as propylene oxide or ethylene oxide to a polyol, such as ethylene glycol, glycerin, or sorbitol, to prepare a compound, and reacting the compound with a polycarboxylic acid, such as adipic acid or phthalic acid.

Examples of the polyether polyol include a compound obtained by adding an alkylene oxide, such as propylene oxide or ethylene oxide to a polyol, such as ethylene glycol, glycerin, or sorbitol. The number of hydroxy group or the hydroxyl value of the polyol may be changed by adjusting the kind, molecular weight, condensation degree, or the like of raw material components.

In order to form a molten solid having durability by a heat treatment such as a flame treatment, it is preferable to use a polyol such that each of the polyester polyol and the polyether polyester polyol is used singly or in combination of two or more thereof. When a usage ratio of the polyol including such polyester components is increased, a viscosity of the melt of a foam that has been melted by a heat treatment is increased, so that the melt is aggregated to more easily form a molten solid. Since the flame lamination property of a cushion layer including a polyurethane foam can be improved, when a urethane resin skin material is laminated to a surface of the cushion layer, the work efficiency can be high, and the urethane resin skin material can be jointed with the surface of the cushion layer without interposing an adhesive or the like.

Also, a crosslinking agent may be included as a part of the polyols. Examples of the crosslinking agent as a part of the polyols include: a polyol (multifunctional alcohol), such as polyethylene glycol, diethylene glycol, polypropylene glycol, glycerin, trimethylolpropane, pentaerythritol, or sorbitol; and a compound obtained by extending the chain of the above described polyol with an alkylene oxide or the like. By containing a crosslinking agent, the crosslink density of a flexible polyurethane foam material can be increased, and the mechanical properties of a cushion layer can be improved.

A polyisocyanate that is reacted with the polyol is a compound having a number of isocyanate groups, and specific examples thereof include tolylene diisocyanate (TDI), 4,4-diphenylmethane diisocyanate (MDI), 1,5-naphthalene diisocyanate (NDI), triphenylmethane triisocyanate, xylylene diisocyanate (XDI), hexamethylene diisocyanate (HDI), dicyclohexylmethane diisocyanate, and isophorone diisocyanate (IPDI). Among these, tolylene diisocyanate is preferable from the viewpoint of ease of production of a low density (small specific gravity) polyurethane foam.

A catalyst that is contained in the foam raw material is used for accelerating a resinification reaction (urethanization reaction) between the polyol and the polyisocyanate, and for accelerating a foaming reaction between the polyisocyanate and water as a foaming agent.

As a catalyst for selectively accelerating a resinification reaction, a metal catalyst is used, and as a catalyst for accelerating a foaming reaction, an amine catalyst is especially used. Specific examples of the metal catalyst include: an organic tin compound, such as tin octylate (tin octoate), dibutyltin dilaurate, tin dibutyldiacetate, tin di(2-ethylhexyl) dilaurate, and tin di(2-ethylhexanoate); and lead di(2-ethylhexanoate). Specific examples of the amine catalyst include a tertiary amine, such as N,N',N'-trimethylaminoethylpiperazine, triethylenediamine, or dimethylethanolamine.

The foaming agent is a component that foams a polyurethane to form a polyurethane foam. Examples of the foaming agent include water (which reacts with a polyisocyanate to generate carbon dioxide gas) that is commonly used in the production of a flexible polyurethane foam material. Further, a combination of water with an auxiliary foaming agent, examples of which include a halogenated aliphatic hydrocarbon, such as methylene chloride or trichloroethane, and carbon dioxide, as well as a combination with an acid amide are preferable combinations. Among these foaming agents, water is preferable, because it is superior in the reactivity of a foaming reaction, and in handling. However, in the case in which a lightweight foam is required, not only water but a combination with an auxiliary foaming agent, such as a halogenated hydrocarbon or carbon dioxide, is preferable.

The foam raw material may contain as needed, in addition to the raw materials described above, a crosslinking accelerator, a flame retardant, a water repellent agent, an antioxidant, a UV absorbent, a colorant, a foam stabilizer, a foam breaker (filler), a film-forming aid, etc. according to the ordinary method.

A foam stabilizer is used as needed to facilitate smooth progress of the foaming that is caused by a foaming agent. As the foam stabilizer, those commonly used in producing a flexible polyurethane foam material may be used. Specific examples of the foam stabilizer that is used include a silicone compound, an anionic surfactant, such as sodium dodecylbenzene sulfonate or sodium lauryl sulfate, a polyether siloxane, and a phenolic compound. A content of the foam stabilizer may be set according to an ordinary method.

As the flexible polyurethane foam material used for forming a cushion layer in the present disclosure, a flexible slab polyurethane foam obtained by a slab foaming method is preferable.

By a slab foaming method, foam raw materials (reactant mixture) that have been mixed with stirring are discharged on a belt conveyor, and the foam raw materials react at a normal temperature and under an atmospheric pressure causing spontaneous foaming while the belt conveyor is in movement, to yield a flexible polyurethane foam.

By slicing the formed flexible polyurethane foam to a predetermined thickness, a flexible polyurethane foam material that forms a cushion layer can be obtained.

For forming a cushion layer, a publicly known method of forming a synthetic resin layer that encloses air bubbles, such as a method in which a foam raw material (a precursor of a cushion layer forming material) that includes a foaming agent, and a synthetic resin or a synthetic resin precursor is coated on a side of the base cloth of the skin material, and then expanded and cured to form a cushion layer that is composed of a synthetic resin foam (a cushion layer forming material), and a method in which an uncured urethane resin precursor is subjected to a shear force to cause mechanical foaming, and the urethane resin precursor (a precursor of a cushion layer forming material) containing air bubbles is coated on a side of the base cloth of the skin material, and then the urethane resin is cured to form a cushion layer, may be applied.

Although a flexible polyurethane foam material that constitutes the cushion layer is an elastic member, it can maintain its shape, when it is compressed in a predetermined temperature range, that is, plastic deformation is possible. A plastic deformation temperature of the flexible polyurethane foam material is preferably 130° C. or higher, and more preferably 150° C. or higher.

When the plastic deformation temperature is 130° C. or higher, the formability in forming recesses in a synthetic resin skin material composite, and the shape retainability of recesses after formation are further improved.

An upper limit of the plastic deformation temperature is lower than the temperature at which a flexible polyurethane foam material is thermally decomposed to melt, and is preferably 250° C. or lower from the viewpoint of productivity.

A density of the cushion layer is preferably in a range of from 15 kg/m$^3$ to 100 kg/m$^3$, and more preferably in a range of from 18 kg/m$^3$ to 60 kg/m$^3$.

There is no particular restriction on the thickness of the cushion layer. From the viewpoint of ease of formation of a deep recess, it is preferable that the thickness of the cushion layer is larger than the thickness of the urethane resin skin material described above.

Among these, from the viewpoints that a moderate cushioning property can be developed easily, and the processability in forming a deep recess is more favorable, the thickness including bubbles is preferably from 1 mm to 15 mm, and more preferably from 3 mm to 10 mm.

Although there may be a number of cushion layers, a total thickness of the cushion layers, in a case where there are a number of cushion layers, is preferably in the range described above.

[Other Layers]

The synthetic resin skin material composite of the present disclosure may be provided with other layers in addition to the urethane resin skin material and the cushion layer to the extent that the effect is not impaired.

Examples of such other layers include the above-described adhesive layer for improving the adhesion between the respective layers, and a surface treatment layer for regulating at least one of surface property or appearance of the skin layer.

(Surface Treatment Layer)

A surface treatment layer may be formed by coating, on a surface of the skin layer of a urethane resin skin material, a surface treatment agent composition that contains a water-based resin emulsion, an organic solvent-based surface treatment agent composition that contains a resin, or the like.

As a resin that is used for forming a surface treatment layer, any resin may be used depending on the intended used. Preferable examples of the resin that is used for forming a surface treatment layer include a polyurethane, an acryl, and an elastomer, and a polyurethane is more preferable.

When a surface treatment layer is formed on a surface of the skin layer, the appearance is further improved.

The surface treatment layer may contain a crosslinking agent, an organic filler, a lubricant, a flame retardant, etc. For example, when the surface treatment layer contains an organic filler, a lubricant, etc., a smooth feel is imparted to the skin material and the wear resistance is further improved.

[Holes Penetrating Urethane Resin Skin Material in Thickness Direction]

The synthetic resin skin material composite of the present disclosure may have a number of holes that penetrate the urethane resin skin material in a thickness direction of the synthetic resin skin material composite.

When the urethane resin skin material has holes that penetrate the urethane resin skin material in the synthetic resin skin material composite, the synthetic resin skin material composite can be superior in air permeability and moisture permeability.

FIG. 3 is a schematic sectional view showing a synthetic resin skin material composite 26 in which a urethane resin skin material has a number of holes 30 that penetrate the urethane resin skin material in a thickness direction of the synthetic resin skin material composite 26.

The synthetic resin skin material composite 26 shown in FIG. 3 has a number of holes 30 that penetrate the urethane resin skin material 15.

The number of holes may be holes that penetrate the urethane resin skin material and the cushion layer in a thickness direction of the synthetic resin skin material composite.

Figure 4:
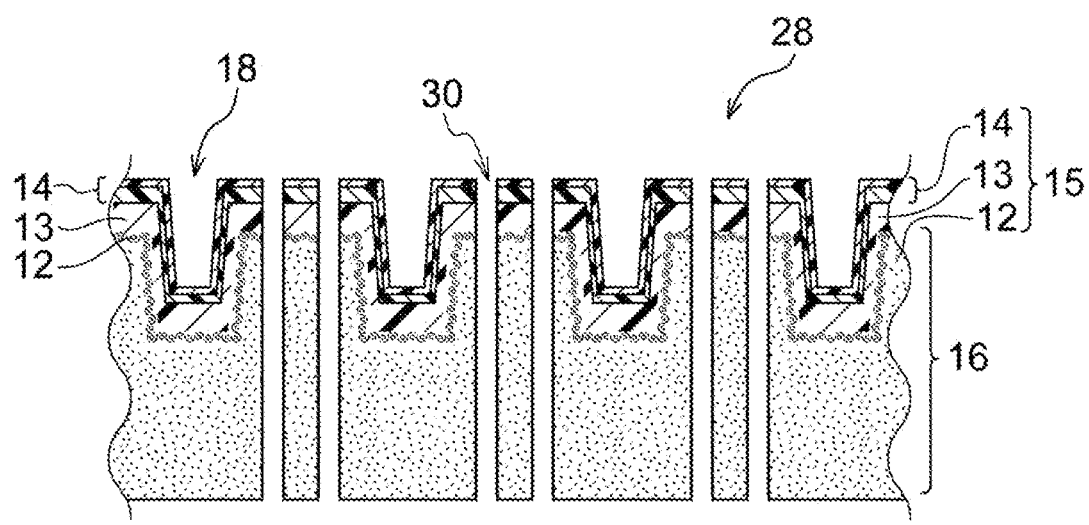
FIG. 4 is a schematic sectional view showing a synthetic resin skin material composite having a number of holes that penetrate the synthetic resin skin material composite in a thickness direction of a synthetic resin skin material composite, which is another embodiment of the present invention.

FIG. 4 is a schematic sectional view showing a synthetic resin skin material composite 28 having a number of holes 30 that penetrate the synthetic resin skin material composite 28 in the thickness direction of the synthetic resin skin material composite 28.

The synthetic resin skin material composite 28 shown in FIG. 4 has a number of holes 30 that penetrate the urethane resin skin material 15, and the cushion layer 16 that is laminated with the urethane resin skin material 15. In other words, the synthetic resin skin material composite 28 shown in FIG. 4 has a number of holes 30 that penetrate the synthetic resin skin material composite 28.

Since the synthetic resin skin material composite of the present disclosure has, in the above-described laminate of the urethane resin skin material and the cushion layer, deep recesses that extend from a side of the skin layer into the cushion layer, it is provided with three-dimensional stepped portions, and is superior in durability and designability. Consequently, the synthetic resin skin material composite of the present disclosure can be used favorably in various applications, such as automobile interior parts, railway vehicle interior parts, aircraft interior parts, furniture, shoes, footwear, bags, interior/exterior materials for buildings, outer covering materials or backing materials for clothes, or covering materials for walls.

[Method of Producing Synthetic Resin Skin Material Composite]

There is no particular restriction on the method of producing the above-described synthetic resin skin material composite of the present disclosure, and it can be produced by a publicly known production method.

Among these, production according to the method of producing a synthetic resin skin material composite of the present disclosure described below is preferable, because a synthetic resin skin material composite that has deep recesses and is superior in durability can be produced.

The method of producing a synthetic resin skin material composite of the present disclosure includes a step of forming a urethane resin skin layer at one surface of a substrate, to yield a urethane resin skin material [Step (A)]; a step of adhering a cushion layer forming material to a side of the urethane resin skin material at which the urethane resin skin layer is not provided, to yield a laminate that has, on the urethane resin skin material, a cushion layer formed by the cushion layer forming material [Step (B)]; a step of placing the yielded laminate between a pair of molds including a first mold with an embossing die and a second mold without an embossing die, heating the first mold at a temperature in a range of from 130° C. to 160° C. and heating the second mold at a temperature in a range of from 140° C. to 200° C., and pressing protrusions of the embossing die of the first mold onto a side of the urethane resin skin layer of the laminate for embossing under a condition that tips of the protrusions of the embossing die of the first mold extend into the cushion layer in a region of the laminate without a recess, thereby forming recesses having depths such that the recesses extend into the cushion layer beyond an interface between the urethane resin skin material and the cushion layer [Step (C)].

The respective steps will be described accordingly.

[Step (A): Step of Forming Urethane Resin Skin Layer at One Surface of Substrate, to Yield Urethane Resin Skin Material]

In Step (A), a urethane resin skin layer is formed at one surface of a substrate, to yield a urethane resin skin material.

There is no particular restriction on the method of forming a skin layer. Examples of the method of forming a skin layer include a method in which a composition for forming a skin layer is coated on a release material to form a layer of the composition for forming a skin layer, and the same is laminated on a substrate to form a skin layer on the substrate, thereby obtaining a urethane resin skin material.

The composition for forming a skin layer includes a polyurethane that is a resin as a base component, or the like. When the composition for forming a skin layer includes a polyurethane, the synthetic resin skin material composite is more favorable in durability and elasticity, deep recesses can be formed easily, and the formed recesses are superior in durability. The polyurethane may be either water-based polyurethane or solvent-based polyurethane, and may be appropriately selected for use depending on the purpose.

Examples of the polyurethane include a polycarbonate polyurethane, a polyether polyurethane, a polyester polyurethane, and a modified product thereof. In the case in which long-term durability is required, a polycarbonate polyurethane is preferable.

In the composition for forming a skin layer, a polyurethane may be used singly, or in combination of two or more thereof. For example, a polycarbonate polyurethane, which is a preferable polyurethane, may be used in combination with a polyurethane other than a polycarbonate polyurethane.

Examples of the water-based polyurethane include a polyurethane in which from 0.01% to 10%, preferably from 0.05% to 5%, and more preferably from 0.1% to 2% of carboxyl groups in terms of mass ratio with respect to a water-based polyurethane base component are introduced into a part of the molecular chain of a urethane base component, in the case in which a homopolymer of a water-based polyether or polycarbonate polyurethane, or a mixture or a copolymer of a polyether polyurethane and a polycarbonate polyurethane is used. When carboxyl groups are introduced in the above-described range of the mass ratio, the water-based polyurethane can have sufficient water dispersibility and dry film formability owing to the presence of the carboxyl groups.

Examples of the solvent-based polyurethane include at least one solvent-based polyurethane selected from the group consisting of a polycarbonate polyurethane, a polyether polyurethane, and a polyester polyurethane that are soluble in an organic solvent, as well as a modified product thereof. The solvent-based polyurethane may be a one-component type, or a two-component type.

Also, from the viewpoint that the film strength of the skin layer to be formed is further improved, it is preferable that the polyurethane has a crosslinked structure after curing.

Taking an example of an embodiment in which a crosslinked structure is introduced into a water-based polyurethane, for example, a crosslinked structure can be formed by using a polyurethane base component into which a carboxyl group has been introduced, and allowing the carboxyl group to react with a crosslinking agent.

Examples of a crosslinking agent that may be used in the composition for forming a skin layer for forming a crosslinked structure include a conventionally publicly known crosslinking agent. Examples thereof include an isocyanate crosslinking agent, an epoxy crosslinking agent, an aziridine crosslinking agent, a carbodiimide crosslinking agent, and an oxazoline crosslinking agent. Among these, use of a carbodiimide crosslinking agent is preferable from the viewpoint of suppressing hydrolysis of polyurethane.

Further, taking an example of an embodiment in which a crosslinked structure is introduced into a solvent-based polyurethane, for example, there is an example of an embodiment in which a solvent-based block isocyanate polyurethane is used as a base component in combination with an amine as a crosslinking component. By using an amine in combination, a blocking agent is dissociated during the heat curing of a polyurethane, and a crosslinked structure can be formed in the polyurethane.

The composition for forming a skin layer may further contain other components in addition to the resin to become a base component, and the solvent.

Examples of such other components that can be added to the composition for forming a skin layer include a crosslinking agent, a colorant, and a feel improver.

The composition for forming a skin layer may contain a colorant.

Examples of the colorant include colored organic resin fine particles in which a colorant is combined with organic resin fine particles that are selected from urethane resin particles, acrylic resin particles, silicone resin particles, or the like. Among these, a colorant containing polycarbonate colored resin particles is preferable from the viewpoints of affinity and uniform dispersibility with respect to a polyurethane resin serving as a dispersion medium.

An average particle diameter of the organic resin fine particles is generally preferably in a range of from 0.01 μm to 100 μm, and more preferably in a range of from 3 μm to 50 μm.

There is no particular restriction on the method of applying the composition for forming a skin layer to a surface of a release material, and a publicly known application method can be used. Examples of the application method include a coating method using a hermetically closed coating heads or an open coating head.

There is no particular restriction on the coating amount of the composition for forming a skin layer and the film thickness of the skin layer to be formed, and they may be appropriately selected depending on the purpose.

In general, the coating amount in terms of the coating amount before drying the composition for forming a skin layer is preferably in a range of from 50 g/m$^2$ to 300 g/m$^2$, and more preferably in a range of from 150 g/m$^2$ to 250 g/m$^2$, from the viewpoint of strength and appearance.

The composition for forming a skin layer may be dried by a publicly known method.

As drying conditions, a temperature in a range of from 80° C. to 150° C. is preferable, and a temperature in a range of from 90° C. to 120° C. is more preferable. Under this temperature condition, a drying time may be from 1 min to 5 min, and is preferably from 2 min to 3 min.

As described above, the thickness of the skin layer after drying is preferably in a range of from 10 μm to 100 μm, and more preferably in a range of from 15 μm to 60 μm.

A grain pattern can be formed on a surface of the skin layer.

Examples of a method of forming an emboss pattern include a method including: a step where a layer of the composition for forming a skin layer is formed on a surface of a release material for transferring an emboss pattern on which an emboss pattern has been formed, and then dried by heating to prepare a skin layer on which surface an emboss pattern is formed; and a step where a substrate is brought into contact with, at an opposite side from the side of the release material for transferring an emboss pattern, the obtained skin layer having an emboss pattern formed on its surface, and dried by heating, and then the release material for transferring an emboss pattern is peeled off.

As the method of applying a resin composition for forming a skin layer to a surface of the release material for transferring an emboss pattern, a method in which a resin composition for forming a skin layer is coated on a surface of the release material for transferring an emboss pattern, and then dried may be used, or a transfer method may be used insofar as there is no functional trouble in transferring an emboss pattern.

Any release material for transferring an emboss pattern may be used insofar as a desired emboss shape is formed. For example, a commercially available product may be used, or a material with a desired emboss pattern that has been formed on a surface of a release material by computer graphics or the like may be used.

As will be described later, since the synthetic resin skin material composite of the present disclosure has a stepped pattern having deep recesses, it is not mandatory to form an emboss pattern on the skin layer.

Thus, in Step (A), a urethane resin skin material is formed.

[Step of Forming Cushion Layer to Yield Laminate: Step (B)]

In Step (B), a cushion layer is formed at a side of the urethane resin skin material obtained in Step (A) at which the urethane resin skin layer is not provided, to yield a laminate of the urethane resin skin material and the cushion layer.

The details of the cushion layer forming material, and the method of forming a cushion layer with the cushion layer forming material are described in the section of a cushion layer.

As the cushion layer forming material that is used for forming a cushion layer, a flexible polyurethane foam material that is applicable to the flame lamination step described later is preferable.

That is, Step (B) preferably includes a step of adhering a flexible polyurethane foam material as the cushion layer to the urethane resin skin material.

Step (B) will be more specifically described below by taking as an example an embodiment in which the cushion layer is formed using a flexible polyurethane foam material.

A flexible polyurethane foam for forming a flexible polyurethane foam material is formed by causing reaction and expansion of a foam raw material that contains a polyol, a polyisocyanate, and a foaming agent (water), as well as a catalyst, an additive, or the like that is optionally used in combination. The polyol preferably includes a polyester polyol or a polyether polyester polyol that has at least an ester bond. The flexible polyurethane foam formed and expanded from the foam raw material is cut into a sheet form, thereby yielding a flexible polyurethane foam material.

The details of the foam raw material are as described in the section of a cushion layer.

Then, the flexible polyurethane foam material formed into a sheet form, and the urethane resin skin material obtained in Step (A) are adhered together to yield a laminate. The flexible polyurethane foam material is adhered to a side of the substrate of the urethane resin skin material.

Examples of the adhering method include a method using the above-described adhesive layer, and a method using a flame lamination step.

The adhering method using an adhesive layer may be a method of forming, between a flexible polyurethane foam material and a urethane resin skin material, an adhesive layer which is similar to that used for adhesion between the substrate and the urethane resin skin layer as described above.

When a flexible polyurethane foam material is used as the cushion layer in Step (B), a flame lamination step is preferably included from the viewpoint of higher productivity.

The flame lamination step is a step in which a surface of the polyurethane foam material that is a cushion layer is heated by a flame of a burner or the like, to thermally melt the surface of the polyurethane foam material, and the substrate surface of the urethane resin skin material that has been previously obtained in Step (A) is brought into contact with the melted area, followed by cooling under pressure to adhere the urethane resin skin material and the cushion layer.

When the method of adhering a urethane resin skin material and a cushion layer by a flame lamination step is applied, the urethane resin skin material and the cushion layer are tightly adhered together in the time shorter than an adhesion method using an adhesive layer prepared by coating and then drying an adhesive to cure. For this reason, the productivity of the laminate is further improved. Furthermore, since there is no adhesive layer between the urethane resin skin material and the cushion layer, a thickness of the synthetic resin skin material composite can be made thinner. Accordingly, there is an advantage that formation of recesses described below can be performed more efficiently.

[Step of Forming Recesses Having Depths Extending into Cushion Layer in Laminate: Step (C)]

In Step (C), recesses are formed in the laminate of a urethane resin skin material and a cushion layer obtained in Step (B).

That is, Step (C) is a step of forming, at a side of the urethane resin skin layer of the laminate, recesses having depths in a thickness direction of the synthetic resin skin material composites such that the recesses extend from the urethane resin skin layer into the cushion layer beyond an interface between the urethane resin skin material and the cushion layer.

Step (C) includes: a step of placing the laminate between a pair of molds including a first mold with an embossing die and a second mold without an embossing die, heating the first mold at a temperature in a range of from 130° C. to 160° C. and heating the second mold at a temperature in a range of from 140° C. to 200° C.; and a step of pressing protrusions of the embossing die of the first mold onto a side of the urethane resin skin layer of the laminate for embossing such that tips of the protrusions of the embossing die of the first mold extend from a side of the urethane resin skin layer into the cushion layer, thereby forming recesses.

Figure 5:
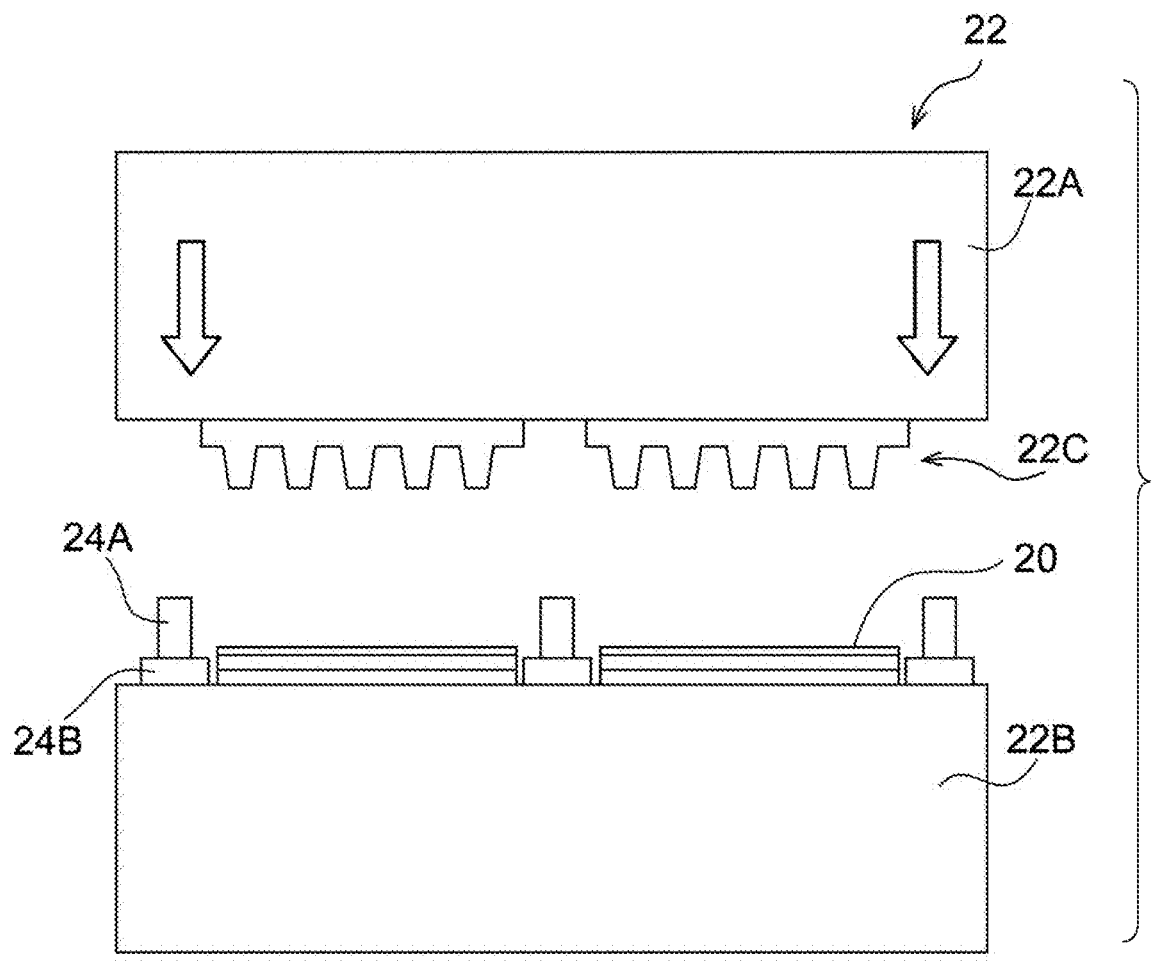
FIG. 5 is a schematic diagram showing an example of a state in which a laminate of a synthetic resin skin material and a cushion layer is placed in a pair of molds that is used for producing a synthetic resin skin material composite.

FIG. 5 is a schematic diagram showing an example of a state in which a laminate 20 that has a urethane resin skin material 15 and a cushion layer 16 is placed in a pair of molds 22 that is used for producing a synthetic resin skin material composite.

First, the yielded laminate 20 is placed between a pair of molds 22 including a mold 22A (first mold) with an embossing die 22C and a mold 22B (second mold) without an embossing die on the surface. The laminate 20 is placed in such a direction that the urethane resin skin layer 14 of the laminate 20 is brought into contact with the embossing die 22C of the mold 22A that is the first mold.

The pair of molds 22, namely the mold 22A and the mold 22B are each heated to the above-described temperature, and tips of the protrusions of the mold 22A with the embossing die 22C are pressed onto a side of the urethane resin skin layer 14 of the laminate 20 for embossing such that tips of the protrusions of the mold 22A extend into the cushion layer 16 beyond an interface between the urethane resin skin material 15 and the cushion layer 16 that is present in a region without a recess. In this manner, the recess 18 having a depth that extends into the cushion layer is formed at a side of the urethane resin skin layer 14 of the laminate 20.

Considering ease of formation of three-dimensional shape, and three-dimensional shape retention, embossing is carried out under such selected conditions of the molds 22 that the first mold with an embossing die is heated at a temperature in a range of from 130° C. to 160° C., and the second mold without an embossing die is heated at a temperature in a range of from 140° C. to 200° C., respectively.

The heating temperature of the first mold with an embossing die is in a range of from 130° C. to 160° C., preferably in a range of from 135° C. to 155° C., and more preferably in a range of from 140° C. to 150° C.

The heating temperature of the second mold without an embossing die is in a range of from 140° C. to 200° C., preferably in a range of from 150° C. to 190° C., and more preferably in a range of from 170° C. to 180° C.

Further, the heating temperature of the first mold with an embossing die is preferably lower than the heating temperature of the second mold without an embossing die.

When the temperature conditions in heating the molds 22 are in the ranges described above, the formability of recess and the shape retention of the formed recess can be superior.

An upper limit of the heating temperature of the first mold with an embossing die is preferably equal to or lower than the softening point of a skin layer.

Regarding the embossing conditions, it is preferable that the pressure is from 20 kgf/cm$^2$ to 50 kgf/cm$^2$, and heating time is from 10 sec to 90 sec, and more preferable that the pressure is applied at about 30 kgf/cm$^2$ for from about 20 sec to about 60 sec.

By setting the embossing conditions in the ranges described above, recesses which is a deep emboss pattern can be formed, and the shape of the formed recesses can be retained over a long period of time, and a synthetic resin skin material composite excellent in durability can be formed.

By selecting the embossing die 22C that is attached to the first mold 22A with an embossing die of the pair of molds 22 shown in FIG. 5, recesses of various shapes can be formed. For this reason, recesses of various designs can be formed by changing only the embossing die 22C in an apparatus having a simple configuration.

In FIG. 5, the protrusions of the embossing die 22C that is attached to the first mold 22A with an embossing die for forming recesses have a cylindrical shape, and their tips are formed flat, but the shape of the protrusions of the embossing die is not limited thereto. The shape of the protrusions of the embossing die may be selected, depending on the intended purpose, from various shapes, examples of which include a cone with a sharp tip, a cylinder with a tip of a hemispherical dome shape, and a prism, such as a triangular prism or a quadrangular prism. For this reason, according to the production method of the present disclosure, a synthetic resin skin material composite having deep recesses of various designs can be obtained.

Further, as shown in FIG. 5, in order to adjust the distance between the first mold 22A with an embossing die and the second mold 22B without an embossing die, spacers 24A and 24B may be placed at the end of the mold. In FIG. 5, two spacers 24A and 24B are placed, but not limited thereto, a thickness of spacer or the number of spacer may be adjusted so that the depth of a recess that is formed in a synthetic resin skin material composite can be easily regulated.

Although FIG. 5 shows an example where the first mold 22A with an embossing die is selected as a movable mold, and the second mold 22B without an embossing die is selected as a fixed mold, without limitation thereto, the mold with an embossing die may be used as a fixed mold, and the mold without an embossing die may be used as a movable mold.

The method of producing a synthetic resin skin material composite of the present disclosure may include other steps in addition to the above-described Step (A), Step (B), and Step (C).

Examples of such other steps include a step of forming a surface treatment layer on a surface of the urethane resin skin material, and a step of forming holes in the obtained synthetic resin skin material composite.

[Step of Forming Number of Holes Penetrating Urethane Resin Skin Material in Thickness Direction of Urethane Resin Skin Material]

Examples of the step of forming air holes in the synthetic resin skin material composite include a step of forming a number of holes that penetrate the urethane resin skin material in a thickness direction of the urethane resin skin material.

The number of holes are preferably holes that penetrate from the urethane resin skin layer which is a top surface of the urethane resin skin material to the base cloth which is a bottom surface of the urethane resin skin material. The number of holes that are formed may be holes that penetrate the urethane resin skin material and the cushion layer, namely holes that penetrate the synthetic resin skin material composite.

When there are a large number of holes that penetrate, in the thickness direction of the synthetic resin skin material composite, the urethane resin skin material, or the urethane resin skin material and the cushion layer, the synthetic resin skin material composite can have superior in air permeability and moisture permeability. Also, the appearance of the synthetic resin skin material composite can be further improved.

The step of forming a number of holes that penetrate the urethane resin skin material in the thickness direction of the urethane resin skin material may be, for example, a step of forming holes with a desired diameter, and at desired intervals in the urethane resin skin material by a punching roll.

The step of forming a number of holes may be performed after the production of a urethane resin skin material, namely after Step (B), or may be performed after the formation of a cushion layer on the surface of a urethane resin skin material, namely after Step (C).

According to the method of producing a synthetic resin skin material composite of the present disclosure, a synthetic resin skin material composite that has a three-dimensional shape with deeper recesses and is favorable in shape retention capability of the formed three-dimensional shape, in comparison with a conventional synthetic resin skin material, can be produced.

According to the method of producing a synthetic resin skin material composite of the present disclosure, the cushioning property is superior, and the shape retention capability of three-dimensional shape by the formed deep recesses is superior. Further, using a publicly known urethane resin skin material, a synthetic resin skin material composite having a three-dimensional shape with deep recesses can be produced. Furthermore, since a synthetic resin skin material composite yielded by the production method of the present disclosure has superior cushioning property and durability owing to its layer structure, it can be favorably used in applications that require durability such as automotive interior parts.

EXAMPLES

The synthetic resin skin material composite and the method of producing the same of the present disclosure will be described more specifically with reference to Examples. The following Examples are merely examples of embodiments, and the present disclosure is not limited to the following Examples.

In Examples, unless otherwise specified, the indications "%" and "parts" described below are in terms of mass basis, respectively.

Example 1

(Production of Urethane Resin Skin Material)

CRISVON (registered trademark) NY-324 (produced by DIC Corporation, polycarbonate polyurethane with a thermal softening temperature of 150° C.) was diluted with a solvent (dimethylformamide: DMF) such that a solid content becomes 15%, to prepare a composition for forming a skin layer. The prepared composition for forming a skin layer was coated on a surface of a release paper ARX196M (trade name, produced by Asahi Roll Co., Ltd.) with a knife coater at a coating amount of 200 g/m$^2$, to form a layer of the composition for forming a skin layer on the surface of the release paper.

An adhesive for forming an adhesive layer was coated at an amount of 150 g/m$^2$ on the back surface of the layer of the composition for forming a urethane resin skin layer, namely the side opposite to the side in contact with the release paper, was heated for drying at 100° C. for 2 min to form, on the release paper, a urethane resin skin layer and an adhesive layer in this order. A base cloth (double knitted fabric: jersey produced by Hayashi Telempu Co., Ltd.) as a substrate was stuck to a side of the adhesive layer of the urethane resin skin layer and adhesive layer that were formed, and was left at 50° C. for 48 hours to cure together with the urethane resin skin layer and the adhesive layer. Thereafter, the release paper was peeled off to obtain a urethane resin skin material having a thickness of 1.2 mm [Step (A)].

(Production of Laminate)

The obtained urethane resin skin material was stuck, by flame lamination, with a polyether polyester flexible urethane foam material produced by a slab foaming method (COLOR FOAM EL-67F produced by Inoac Corporation; sliced to 6 mm-thickness) having a density of 20 kg/m$^3$ (JIS K7222), a hardness of 98.1 (JIS K6400-2), and a compressive residual strain of 8% or less (JIS K6400-4), to form a laminate [Step (B)].

In Step (B), a surface of the polyurethane foam material was heated by flame of a burner to melt the surface of the polyurethane foam material. Then, the substrate surface of the urethane resin skin material prepared previously in Step (A) was brought into contact with the melted area, followed by cooling under pressure to adhere the urethane resin skin material and the cushion layer, to obtain the laminate.

(Production of Synthetic Resin Skin Material Composite)

Next, the obtained laminate was cut into a size of 700 mm in width and 500 mm in length. In this Example, a synthetic resin skin material composite is cut into the size above for evaluation, however the cut size is not limited thereto, and it may be cut into an optional size depending on the intended use of a synthetic resin skin material composite.

The temperature of the first mold 22A with an embossing die of the three-dimensional embossing machine was raised to 150° C., and the temperature of the second mold 22B without an embossing die was raised to 170° C., the embossing die 22C was attached to the first mold 22A, the laminate obtained in Step (B) was placed on the second mold 22B in such a direction that the cushion layer of the laminate contacts the second mold 22B, and the first mold 22A was pressed at a pressure of 29 kgf/cm$^2$ for 40 sec so as to obtain a synthetic resin skin material composite having a three-dimensional pattern in which deep recesses were formed. The depth of the formed recess was 2 mm, and it was confirmed that the bottom of the formed recess was as deep as within the cushion layer in a region without a recess.

Example 2

A laminate was prepared in the same manner as the method of producing a synthetic resin skin material composite in Example 1.

A synthetic resin skin material composite of Example 2 was obtained by using the same molds and forming recesses by embossing under the same conditions as in Example 1, except that the heating temperatures were changed such that the heating temperature of the first mold was 140° C., and the temperature of the second mold 22B was 180° C.

The depth of the formed recess was 5 mm, and it was confirmed that the bottom of the formed recess was as deep as within the cushion layer in a region without a recess.

Comparative Example 1

A laminate was prepared in the same manner as the method of producing a synthetic resin skin material composite in Example 1.

A synthetic resin skin material composite of Comparative Example 1 was obtained by using the same molds and forming recesses by embossing under the same conditions as in Example 1, except that the heating temperatures were changed such that the heating temperature of the first mold was 120° C., and the temperature of the second mold 22B was 130° C.

The depth of the formed recess was 1.1 mm, and the bottom of the formed recess had the depth not reaching the cushion layer in a region without a recess.

Comparative Example 2

A laminate was prepared in the same manner as the method of producing a synthetic resin skin material composite in Example 1.

A synthetic resin skin material composite of Comparative Example 2 was obtained by using the same molds and forming recesses by embossing under the same conditions as in Example 1, except that the heating temperatures were changed such that the heating temperature of the first mold was 170° C., and the temperature of the second mold 22B was 210° C.

The depth of the formed recess was 2 mm, and the bottom of the formed recess had the depth that extends into the cushion layer in a region without a recess. However, the shape of the formed recess was not as designed, and the walls around the recess were melted to adhere together in the middle of the depth direction, or a part of the edges of the recess surface of the synthetic resin skin material composite was deformed due to softening, and recesses with an adequate depth and favorable appearance were not formed.

Comparative Example 3

A laminate was prepared in the same manner as the method of producing a synthetic resin skin material composite in Example 1.

A synthetic resin skin material composite of Comparative Example 2 was obtained by using the same molds and forming recesses by embossing under the same conditions as in Example 1, except that the heating temperatures were changed such that the heating temperature of the first mold was 250° C., and the temperature of the second mold 22B was 250° C.

Since the heating temperatures of the molds were high, the surface of the synthetic resin skin material composite was softened and melted, and recesses were not formed by pressing the embossing die. For this reason, the following evaluation was not performed.

<Evaluation of Synthetic Resin Skin Material Composite>
(Three-Dimensionality)

The depth of the recess of the obtained synthetic resin skin material composite was measured by the following method, and the three-dimensionality of the synthetic resin skin material composite was evaluated according to the following criteria. The results are shown in Table 1 below.
—Criteria—
A: Recess depth is 2 mm or more.
B: Recess depth is 1 mm or more and less than 2 mm.
C: Recess depth is less than 1 mm.
(Durability)

The obtained synthetic resin skin material composite was subjected to a 19.6 N-load plane abrasion test by the following method, and the durability of the synthetic resin skin material composite was evaluated according to the following criteria. The results are shown in Table 1 below.

The test was conducted with reference to JASO M 403/88/Plane abrasion tester for seat skin fabric material (Method B).

As described below, the test was performed in the same manner as in the JASO method, except that the load used in the test condition was changed from the JASO method.
(Test Conditions)

The standard conditions in the JASO method were applied identically to this test, except that the press load of 9.81 N according to the JASO method was changed to the load of 19.6 N.
—Criteria—
A: The recess shape was retained even by 10,000 or more of plane abrasion actions.
B: The recess shape collapsed by 7,500 or more and less than 10,000 of plane abrasion actions.
C: The recess shape collapsed by 7,500 or less of plane abrasion actions.
(Appearance of Embossed Recess)

The appearance of recesses of the obtained synthetic resin skin material composite was observed and evaluated according to the following criteria. Ranks A and B are practically acceptable levels.
—Criteria—
A: Recesses with the depth and shape as designed for the embossing die were formed.
B: Although recesses with the shape approximately as designed for the embossing die were formed, but deformation of part of the recesses was recognized.
C: Recesses corresponding to the designed values of the embossing die were not formed, and it was recognized that the surroundings of recesses fused resulting in insufficient depth, or deformation appeared in the surroundings of recesses.

TABLE 1

| | Temperature conditions of 3D embossing machine | | Evaluation results of synthetic resin skin material composite | | |
|---|---|---|---|---|---|
| | First mold temperature (° C.) | Second mold temperature (° C.) | Three-dimensionality (recess depth) | Durability (19.6N plane abrasion) | Appearance of embossed recess |
| Example 1 | 150 | 170 | A | A | A |
| Example 2 | 140 | 180 | A | A | A |
| Comparative Example 1 | 120 | 130 | C | A | A |
| Comparative Example 2 | 170 | 210 | A | C | C |
| Comparative Example 3 | 250 | 250 | melted | — | — |

As seen from the results shown in Table 1, the synthetic resin skin material composites of Example 1 and Example 2 were provided with a three-dimensional shape having deep recesses, in which the formed three-dimensional shape was retained even by 10,000 or more of plane abrasion actions. From this, it is clear that the synthetic resin skin material composites of Example 1 and Example 2 are favorable in shape retention capability of three-dimensional shape.

On the other hand, with respect to the synthetic resin skin material composite of Comparative Example 1 that was produced under conditions where the heating temperature in embossing was lower, recesses having a sufficient depth were not formed. With respect to the synthetic resin skin material composite of Comparative Example 2 that was produced under conditions where the heating temperature in embossing was higher than the softening temperature of polyurethane, the strength of the synthetic resin skin material composite itself was decreased due to the severe heating conditions, and sufficient three-dimensional shape retention capability was not obtained and the durability was inferior. In addition, the shape of the formed recess was not as designed, and the walls around the recess were fused together in the middle of the depth direction, or part of the edges of the recess surface of the synthetic resin skin material composite was deformed due to softening, and recesses with an adequate depth and favorable appearance were not formed. Further, in Comparative Example 3, in which the production was conducted under a condition where the heating temperature in embossing was further higher than that of Comparative Example 2, the surface of the synthetic resin skin material was melted and recesses were not formed.

The disclosure of Japanese Patent Application No. 2017-192165 filed on Sep. 29, 2017 is incorporated herein by reference.

All publications, patent applications, and technical standards described herein are herein incorporated by reference to the same extent as if each individual publication, patent application, or technical standard was specifically and individually indicated to be incorporated by reference.

DESCRIPTION OF SYMBOLS 10, 26, 28 Synthetic resin skin material composite
12 Substrate (base cloth)
13 Adhesive layer
14 Urethane resin skin layer
15 Urethane resin skin material
16 Cushion layer
18 Recess (emboss pattern)
20 Laminate of urethane resin skin layer and cushion layer
22 Mold
22A First mold with embossing die (movable mold with embossing die)
22B Second mold without embossing die (fixed mold without embossing die)
22C Embossing die
24A Mold spacer
24B Mold spacer
30 Hole penetrating urethane resin skin material (through-hole)

What is claimed is:

1. A synthetic resin skin material composite, comprising:
   a urethane resin skin material comprising a urethane resin skin layer provided at one surface of a substrate, wherein the urethane resin skin layer is formed from a composition comprising a water-based polyurethane that is a homopolymer of a polyether or polycarbonate polyurethane, or that is a mixture or a copolymer of a polyether polyurethane and a polycarbonate polyurethane, in which from 0.01% to 10% of carboxyl groups in terms of mass ratio with respect to the water-based polyurethane are a part of the molecular chain of the water-based polyurethane; and
   a cushion layer that is placed at a surface on an opposite side of the substrate from the surface of the urethane resin skin material at which the urethane resin skin layer is provided, wherein the cushion layer consists of a polyurethane foam;
   wherein the substrate includes a base cloth of a woven fabric or a knitted fabric; and
   wherein the urethane resin skin material has recesses at a side of the urethane resin skin layer, and each of the recesses has a depth in a thickness direction of the synthetic resin skin material composite, such that the recesses extend from the urethane resin skin layer into the cushion layer beyond an interface between the urethane resin skin material and the cushion layer that is present in a region without a recess.

2. The synthetic resin skin material composite according to claim 1, wherein a thickness of the cushion layer is from 1 mm to 15 mm, and the thickness of the cushion layer is larger than a thickness of the urethane resin skin material.

3. The synthetic resin skin material composite according to claim 1, wherein the urethane resin skin material is a dry resin skin material or a wet resin skin material.

4. The synthetic resin skin material composite according to claim 1, wherein the synthetic resin skin material has a plurality of holes that penetrate entirely through the urethane resin skin material and the cushion layer in the thickness direction of the synthetic resin skin material composite.

5. The synthetic resin skin material composite according to claim 1, wherein the base cloth is the only fabric layer in the synthetic resin skin material composite.

6. The synthetic resin skin material composite according to claim 1, wherein the polyurethane foam is a flexible polyurethane foam.

7. The synthetic resin skin material composite according to claim 1,
   wherein the urethane resin skin material has a plurality of holes that penetrate the urethane resin skin material in the thickness direction of the synthetic resin skin material composite, and wherein the plurality of holes do not penetrate through the cushion layer.

8. An automotive interior part comprising the synthetic resin skin material composite according to claim 1.

9. A synthetic resin skin material composite, comprising:
   a urethane resin skin material comprising a urethane resin skin layer provided at one surface of a substrate; and
   a cushion layer that is placed at a surface on an opposite side of the substrate from the surface of the urethane resin skin material at which the urethane resin skin layer is provided, wherein the cushion layer consists of a polyurethane foam, wherein the polyurethane foam is a reaction product of a polyol and a polyisocyanate, wherein the polyol is a polyether polyester polyol;
   wherein the substrate includes a base cloth of a woven fabric or a knitted fabric; and
   wherein the urethane resin skin material has recesses at a side of the urethane resin skin layer, and each of the recesses has a depth in a thickness direction of the synthetic resin skin material composite, such that the recesses extend from the urethane resin skin layer into the cushion layer beyond an interface between the urethane resin skin material and the cushion layer that is present in a region without a recess.

10. A synthetic resin skin material composite, comprising:
a urethane resin skin material comprising a urethane resin skin layer provided at one surface of a substrate, wherein the urethane resin skin layer is formed from a composition comprising a water-based polyurethane that is a homopolymer of a polyether or polycarbonate polyurethane, or that is a mixture or a copolymer of a polyether polyurethane and a polycarbonate polyurethane, in which from 0.01% to 10% of carboxyl groups in terms of mass ratio with respect to the water-based polyurethane are a part of the molecular chain of the water-based polyurethane; and
a cushion layer that is placed at a surface on an opposite side of the substrate from the surface of the urethane resin skin material at which the urethane resin skin layer is provided;
wherein the substrate includes a base cloth of a woven fabric or a knitted fabric; and
wherein the urethane resin skin material has recesses at a side of the urethane resin skin layer, and each of the recesses has a depth in a thickness direction of the synthetic resin skin material composite, such that the recesses extend from the urethane resin skin layer into the cushion layer beyond an interface between the urethane resin skin material and the cushion layer that is present in a region without a recess; and
wherein the synthetic resin skin material composite is an automotive interior part.

11. A method of producing a synthetic resin skin material composite, the method comprising:
forming a urethane resin skin layer at one surface of a substrate, to yield a urethane resin skin material, wherein the substrate includes a base cloth of a woven fabric or a knitted fabric, and wherein the urethane resin skin layer is formed from a composition comprising a water-based polyurethane that is a homopolymer of a polyether or polycarbonate polyurethane, or that is a mixture or a copolymer of a polyether polyurethane and a polycarbonate polyurethane, in which from 0.01% to 10% of carboxyl groups in terms of mass ratio with respect to the water-based polyurethane are a part of the molecular chain of the water-based polyurethane;
forming a cushion layer at a side of the urethane resin skin material at which the urethane resin skin layer is not provided, to yield a laminate of the urethane resin skin material and the cushion layer, wherein the cushion layer consists of a polyurethane foam; and
placing the yielded laminate between a pair of molds comprising a first mold with an embossing die and a second mold without an embossing die, heating the first mold at a temperature in a range of from 130° C. to 160° C. and heating the second mold at a temperature in a range of from 140° C. to 200° C., and pressing protrusions of the embossing die of the first mold onto a side of the urethane resin skin layer of the laminate for embossing under a condition that tips of the protrusions of the embossing die of the first mold extend into the cushion layer, thereby forming recesses having depths such that the recesses extend into the cushion layer beyond an interface between the urethane resin skin material and the cushion layer.

12. The method of producing a synthetic resin skin material composite according to claim 11, wherein the forming a cushion layer at a side of the urethane resin skin material at which the urethane resin skin layer is not provided, to yield a laminate of the urethane resin skin material and the cushion layer, comprises adhering a flexible polyurethane foam material as the cushion layer.

13. The method of producing a synthetic resin skin material composite according to claim 12, wherein the adhering a flexible polyurethane foam material as the cushion layer comprises flame lamination.

14. The method of producing a synthetic resin skin material composite according to claim 13, wherein the urethane resin skin material is a dry resin skin material or a wet resin skin material.

15. The method of producing a synthetic resin skin material composite according to claim 12, wherein the urethane resin skin material is a dry resin skin material or a wet resin skin material.

16. The method of producing a synthetic resin skin material composite according to claim 11, wherein the urethane resin skin material is a dry resin skin material or a wet resin skin material.

17. The method of producing a synthetic resin skin material composite according to claim 11, further comprising forming a plurality of holes that penetrate entirely through the urethane resin skin material and the cushion layer in a thickness direction of the synthetic resin skin material composite.

18. The method of producing a synthetic resin skin material composite according to claim 11, wherein the polyurethane foam is a reaction product of a polyol and a polyisocyanate, wherein the polyol is a polyester polyol or a polyether polyester polyol.

19. The method of producing a synthetic resin skin material composite according to claim 11, wherein the method further comprises introducing a plurality of holes into the synthetic resin skin material such that the plurality of holes penetrate the urethane resin skin material in the thickness direction of the synthetic resin skin material composite but do not penetrate through the cushion layer.

20. The method of producing a synthetic resin skin material composite according to claim 11, wherein the synthetic resin skin material composite is formed into an automotive interior part.

\* \* \* \* \*